Jan. 8, 1957 H. H. MUELLER 2,776,837

POSITIVE ENGAGEMENT INTERLOCKING PHONOGRAPH RECORD

Filed June 30, 1952 2 Sheets-Sheet 1

Herman H. Mueller
INVENTOR.

BY Clarence A. O'Brien
and Harvey B. Jacobson
Attorneys

POSITIVE ENGAGEMENT INTERLOCKING PHONOGRAPH RECORD

Filed June 30, 1952 2 Sheets-Sheet 2

Herman H. Mueller
INVENTOR.

BY Clarence A. O'Brien
and Harvey B. Jacobson
Attorneys

United States Patent Office 2,776,837

Patented Jan. 8, 1957

2,776,837

POSITIVE ENGAGEMENT INTERLOCKING PHONOGRAPH RECORD

Herman H. Mueller, Ephrata, Pa.

Application June 30, 1952, Serial No. 296,383

1 Claim. (Cl. 274—42)

This invention comprises novel and useful improvements in a positive engagement interlocking phonograph record disc and includes subject matter disclosed but not claimed in my prior Patent Number 2,559,786 issued July 10, 1951, for Interlocking Phonograph Turntable Cover, and also presents improvements over the disclosure of said patent.

The invention disclosed hereinafter also relates to subject matter set forth in my prior applications: Serial No. 98,048, filed June 9, 1949, for Automatic Interlocking Dual Phonograph Record Player and which has now matured into Patent No. 2,729,455 of January 3, 1956; Serial No. 296,558 filed July 1, 1952, for Tone Arm and Control Mechanism for Automatic Interlocking Dual Phonograph Record Player; Serial No. 296,382 filed June 30, 1952, for Turntable and Drive for Automatic Interlocking Dual Phonograph Record Player; Serial No. 314,987 filed October 16, 1952, for Automatic Interlocking Dual Phonograph Record Player.

The primary objects and purposes of this invention are to provide a construction whereby relative rotation or slippage between a phonograph record disc and an adjacent turntable, supporting and driving means or an adjacent phonograph record disc shall be positively prevented; and whereby the sound tracks of record discs will be maintained in spaced relation with respect to each other or to an adjacent turntable, to thereby prevent attrition or wear which would result from the rubbing of the sound tracks.

Another important object of this invention is to provide a positive engagement interlocking construction for record discs which will facilitate their storage without relative radial or rotational movement, in the novel record storage album forming the subject matter of my prior application, Serial No. 161,519 filed May 12, 1950, for Phonograph Record Disks Safety Interlocking Storage Album, and which has now matured into Patent No. 2,670,261 of February 23, 1954.

More specifically, it is a primary purpose of this invention to provide a construction for attaining the above mentioned previous objects which may be readily applied to conventional record discs at any time after their fabrication, or may be incorporated into record discs during their manufacture.

A still further specific object of the invention is to provide means located at the central portion of a record disc adjacent the spindle aperture of the same and within the inner confines of the sound track of the record for providing an interlocking engagement of a record with either an adjacent record or a turntable; and for spacing a record from adjacent records or a turntable to prevent contact between the sound track portions of adjacent records.

Yet another essential object of this invention resides in the provision of an interlocking construction of phonograph records which positively prevent any slippage between a record and the other records of a stack; and between the turntable and any record whether alone or in a stack and which is carried or driven by the turntable; and to positively insure that each such record shall be rotated at exactly the same speed of rotation as the turntable, to thereby obtain perfect accuracy and fidelity of tone reproduction of the record.

A further and essential object of the invention is to provide means whereby a record may be automatically or manually positively interlocked with and prevented from relative rotation with respect to an adjacent contacting record or turntable and wherein the sound track of the record will be appropriately spaced from the sound track of a contacting record or the surface of a contacting turntable.

A further very important object of the invention is to provide a construction in accordance with the foregoing objects which shall not materially increase the weight or cost of a record or detract from the appearance thereof.

Still another important aim of this invention resides in the provision of an interlocking and positive engagement construction for records which will reenforce, stiffen and strengthen the central portion of a record within the sound track and surrounding the spindle aperture to thereby minimize warping and breakage of a record.

These, together with various ancillary features and objects of the invention, which will later become apparent as the following description proceeds, are attained by the present invention, a preferred embodiment of which has been illustrated by way of example only in the accompanying drawings wherein.

Figure 6:
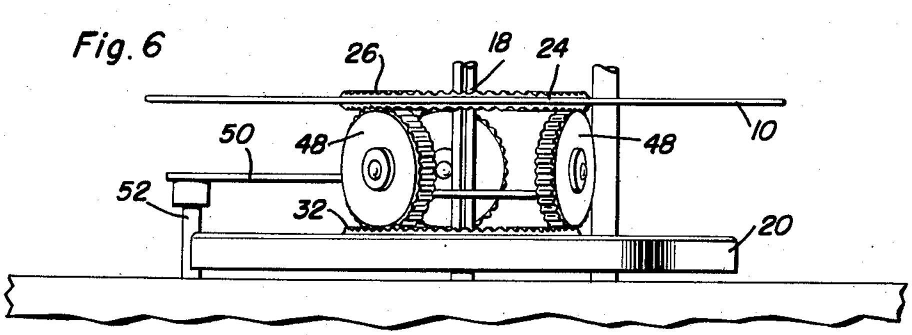
Figure 6 is a fragmentary side elevational view of the arrangement of Figure 5, and showing the manner in which a record is supported above and driven from the turntable through a supporting and driving means, without any slippage.
Figure 7:
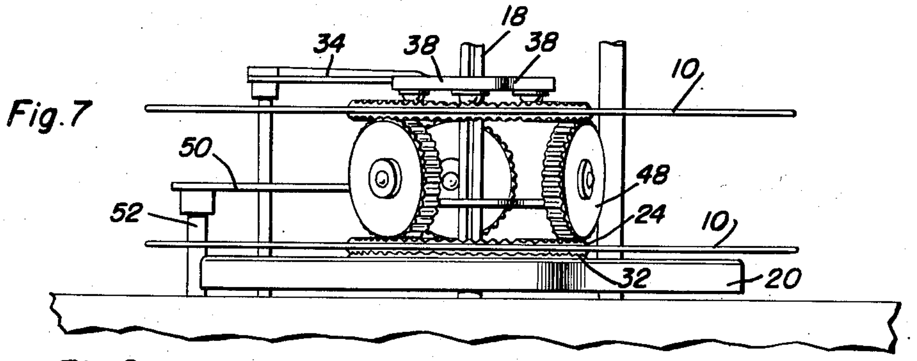
Figure 8:
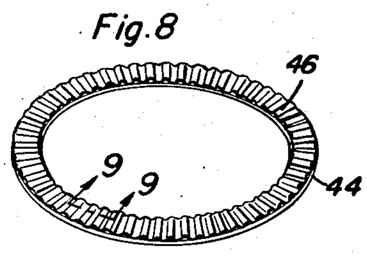
Figure 9:
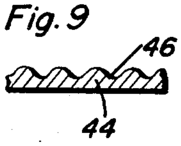

Figure 7 is a view similar to Figure 6 but showing a record mounted upon the supporting means for positive, non-slipping driving engagement whereby together with a pressure means for maintaining the interlocking and non-slipping driving engagement between the record being played, the record driving and supporting means, a turntable, and a record interposed between the turntable and the record supporting and driving means;

Figure 8 is a perspective view of a combined spacing ring and driving and interlocking ring which may be applied to either a record or a turntable in accordance with this invention; and Figure 9 is a detail view of the driving ring construction of Figure 8, being taken substantially upon the plane indicated by the section line 9—9 of Figure 8.

It is well known that dust or grit collect readily in the sound track of records, forming an abrasive which wears the sound grooves each time the record is played. After each traversal of the sound track by a needle, this accumulated grit and broken portions of the sound tracks will be found in the top sides of each sound track or on the needle.

When this abrasive grit accumulation is deposited between adjacent surfaces of records, any relative rubbing or sliding therebetween will cause damage to the sound tracks.

Moreover, in addition to this normal wear, records further become damaged by reason of relatively hard usage occasioned by their employment in cenventional phonograph record players and changers. In such machines, a stack of a plurality of records is placed upon the turntable, and the top record, upon whose sound track the phonograph needle is traveling, is driven by the frictional engagement existing between the adjacent surfaces of each of the records therebelow and the upper surface of the turntable. Further, the sudden dropping of a stationary record from the bottom of a stack upon the rotating turntable and the records thereon causes relative sliding between the records. Obviously, relative rotation of any record in the stack produces abrasion and attrition upon the adjacent, contacting, sound tracks as well as prevents perfect tonal reproduction.

To aggravate the foregoing difficulty, it is well known that records of molded plastic composition quickly become slightly warped and when these are stacked, the warped surfaces including the sound tracks thereon rub upon adjacent surfaces of adjacent records, thereby additionally wearing the sound tracks thereon and impairing the life and efficiency of the record. Further, the occasional sliding and creeping of one record upon the adjacent surface of a contacting record, when a stack of records rests upon the turntable, frequently produces an additional attrition upon the contacting surface. Vibration of the records on the spindle, stack or turntable further increases this last mentioned detrimental effect.

The fundamental purpose of this invention therefore resides in providing an attachment and construction for obviating the above-mentioned difficulty, prolonging the life of a record and greatly enhancing the fidelity of the tonal reproduction as originally inscribed thereon. To attain this fundamental purpose, there are provided raised surfaces on both sides of adjacent records upon the central portions thereof within the sound track, which serve both to space adjacent records from each other a sufficient distance to prevent contact even if the records are warped; which strengthen, reenforce and rigidify the records; and which provide interlocking engaging surfaces to positively prevent all relative rotation between the adjacent records when the same are in contact with each other.

Reference is now made more specifically to the accompanying drawings, wherein like numerals designate similar parts throughout the various views. There is provided a substantially conventional form of phonograph record disc 10, provided with a customary sound track 12, the sound track being positioned radially outwardly of a central portion 14 of the disc, this central portion having the customary aperture 16 by means of which the disc is placed upon a spindle 18. Customarily, a stack of records is positioned upon a spindle 18 in an automatic phonograph record player, the records being positioned and disposed above a turntable 20 and held thereabove by a supporting device 22 which may incorporate therein a conventional and known form of apparatus for dispensing records singly from the bottom of the stack to be played by the apparatus.

In accordance with the present invention, means are provided for positively preventing any slippage or relative rotation between adjacent records of a stack of records or between a record and the turntable, and simultaneously for spacing the records from each other by a sufficient distance to prevent contact of the sound tracks of the records even though the sound track portions of the records may be warped.

For that purpose, the central portion of the record 14 and within the sound track 12 thereof, is provided with an annular elevated or raised portion, preferably upon both sides of the record, this ring-like portion being indicated by the numeral 24. The ring 24 is provided upon both sides of the record with an interlocking non-slipping surface which is indicated by the numeral 26, and which may be of various desired shapes or forms of any requisite character. Preferably this surface is provided with an annular series of alternate peaks or projections 28 separated by valleys or depressions 30. It will be appreciated that the actual shape of this interlocking driving surface and the projections 28 which constitute teeth and the valleys 30 therebetween will depend upon the particular apparatus with which the records having these interlocking surfaces are to be employed.

In some instances, the sides of the teeth or projections 28 may be substantially perpendicular to the face of the record, so that no possible slippage will occur as long as the projections of adjacent interlocking surfaces are in engagement with each other. In other instances, a more gradual and sinuous contour of the interlocking surfaces may be provided, as suggested in Figure 4, so as to admit of a less abrupt or smoother and a self seating engagement of adjacent surfaces of adjacent records. In any event however, it is an essential feature of this invention that these surfaces shall be of such a character as to positively prevent any possible slippage of one record upon the other or upon the turntable during the engagement of records with each other and with the turntable. Obviously, where the sides of the projections 28 are disposed at relatively gentle angles with respect to faces of the records 10, as shown in Figure 4, a pressure means may be provided for holding the records with their interlocking surfaces in secure engagement with each other and with the corresponding annular interlocking surface 32 of the turntable 20 which is complementary to the surfaces 26 of the record discs and the similar surfaces of the supporting and driving means, as set forth hereinafter.

Figure 4:
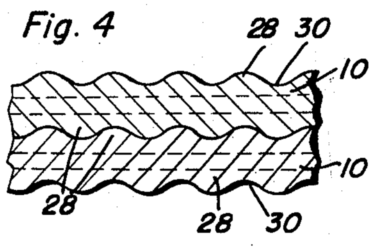
Figure 4 is a detail view upon an enlarged scale, taken substantially upon the plane indicated by the section line 4—4 of Figure 1 and showing the manner in which the adjacent surfaces of two records, or a record and a turntable, are interlockingly engaged for positive and non-slipping rotation as a unit.

As shown in the detail view of Figure 4, the contour of the projections and valleys 28, 30 is a continuous, gradually curving surface, with the projections and valleys being similar and complementary and without abrupt edges. As illustrated, the distances between the projections, the depths of the valleys and the gradualness of their contours is such that upon relative rotation of one record relative to the corresponding surfaces of an adjacent record, and driving means or turntable there will be a gradual sliding engagement of the complemental projections and valleys, without an abrupt engagement. This will prevent a skipping or jumping of the surfaces over each other such as would be likely with a more abrupt contour, while the pressure applied to the top of a record by the pressure means will assure a non-slipping, interlocking, positive engagement of the rounded slopes of the projections and valleys. As shown by the dotted lines in Figure 4, both the tops of the projections 28 and the bottoms of the valleys 30 lie above the surface of the flat central portions.

Figure 1:
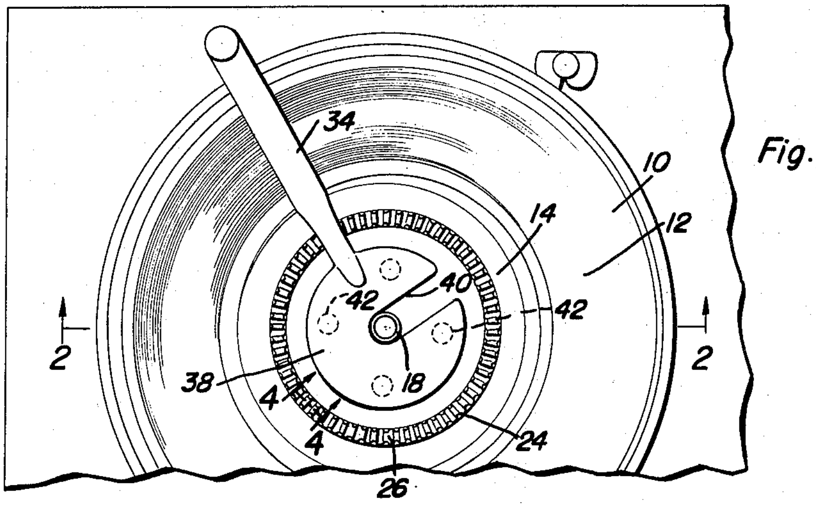
Figure 1 is a fragmentary top plan view of a portion of a phonograph record player, which may be of the character set forth in my prior Patent No. 2,729,455, having operatively positioned thereon a record incorporating therein the principles of this invention.
Figure 2:
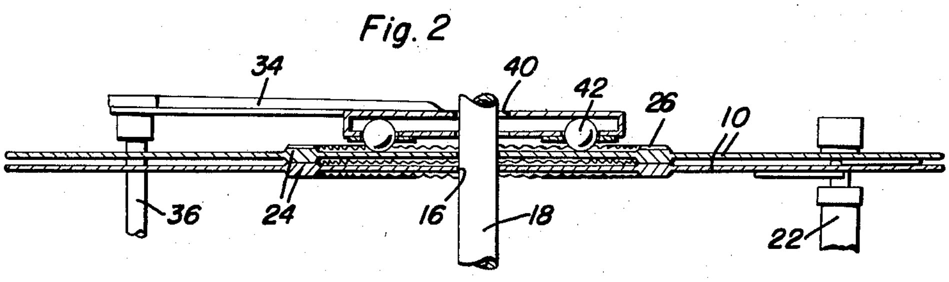
Figure 2 is a vertical transverse sectional detailed view taken upon an enlarged scale substantially upon the plane indicated by the section line 2—2 of Figure 1, parts being broken away and shown in section, and showing a stack of records supported in interlocking engagement above a turntable.
Figure 3:
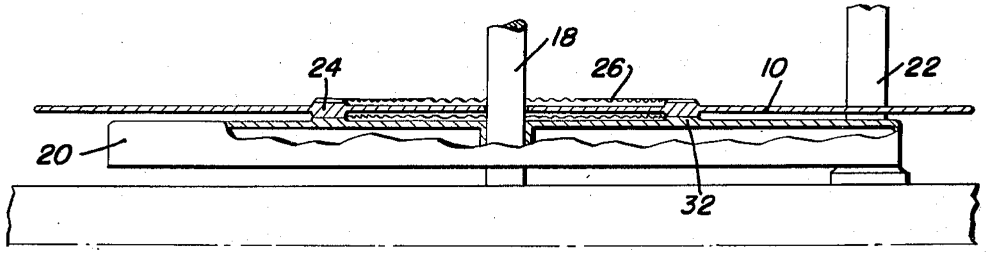
Figure 3 is a view similar to Figure 2 but showing a record seated upon and interlockingly engaged with a turntable for positive non-slipping rotation thereby in accordance with this invention.

Thus, as is shown in Figures 1 and 2, the record player may be provided with a pressure arm 34 carried by a vertical shaft 36 whereby the arm may be raised or lowered and may be swung horizontally by the mechanism of the record player, this arm having at its radially inward end a plate 38 with an arcuate slot 40 adapted to engage and disengage the spindle 18 during horizontal swinging movement of the pressure arm.

Upon its undersurface, the end plate 38 of the pressure arm may be provided with suitable anti-friction bearings or rollers 42 which are adapted to engage, rest upon and apply pressure to the top surface of a record 10, whereby this record may be held in tight engagement with an adjacent record 10 of a stack of records; or against the interlocking surface 32 of the turntable 20 if the record is engaged therewith, or against a supporting and driving means as shown in Figures 6 and 7 and referred to hereinafter.

It will thus be seen that regardless of the shape and contour of the interlocking surfaces, a record will be held against relative rotation with respect to its adjacent record in contact therewith, or relative to the turntable or supporting and driving means if the record is in contact therewith.

It should be observed that the annular portion 24 of the records serves also to support the records and carry the entire weight of a stack of records solely at the central portion of the same within the sound tracks, and to space the records from each other. Thus, even though the sound track portion of a particular record in a stack of records may be warped, the annular projections 24 will space and prevent contact between the sound track portions, thus obviating a heretofore unavoidable source of wear and damage to the sound track of records.

Moreover the rings 24 will serve as a reenforcement for the thin, sheet-like material of the record disc, constituting an inexpensive stiffener or rigidifying means therefor, minimizing warping or breaking of the record.

The above mentioned annular projections 24 and their interlocking surfaces 26 may be formed upon the records in any desired manner. In some instances, it may be preferred to form the same upon the record as by molding the plastic materials during the formation of the record. Obviously, the dimensions and proportions of the interlocking surfaces will be such as to secure the hereinbefore mentioned desired results of spacing, reenforcing or rigidifying and interlocking non-slipping engagement.

When the interlocking surfaces 26 are formed in the material of a record by molding, it will be seen that the material displaced from one surface of the projection 24 by pressing a depression or valley 30 therein results in the forming of the projection 28 on the opposite face. This results in a more even distribution of material during the fabrication, and provides complementary, registering valleys and projections for a precise and compact registration and engagement of adjacent interlocking surfaces of adjacent records, as shown in Figure 4.

In addition, however, to forming the records with the interlocking annular spacing projections during the process of fabricating the records, it is also possible to economically obtain the results and purposes of this invention at least to some extent by applying separately fabricated annular interlocking and spacing rings to the records after their fabrication. Thus, as shown in Figures 8 and 9, an annular ring 44 may be formed of any suitable material such as a plastic, a fiber composition, or a suitable metallic material, and may be secured to the surface of a record upon the central portion of the same and within the sound track of the record as by adhesive or any other desired manner. These rings 44 will be provided with toothed or interlocking surfaces 46 corresponding to the previous mentioned surfaces 28, and serving the same purpose.

The particular record disc having the spacing and interlocking annular projections, while useful with any conventional record changer and player, as setforth hereinbefore, is particularly useful in a phonograph record player of the character set forth in my prior Patent No. 2,729,455.

Figure 5:
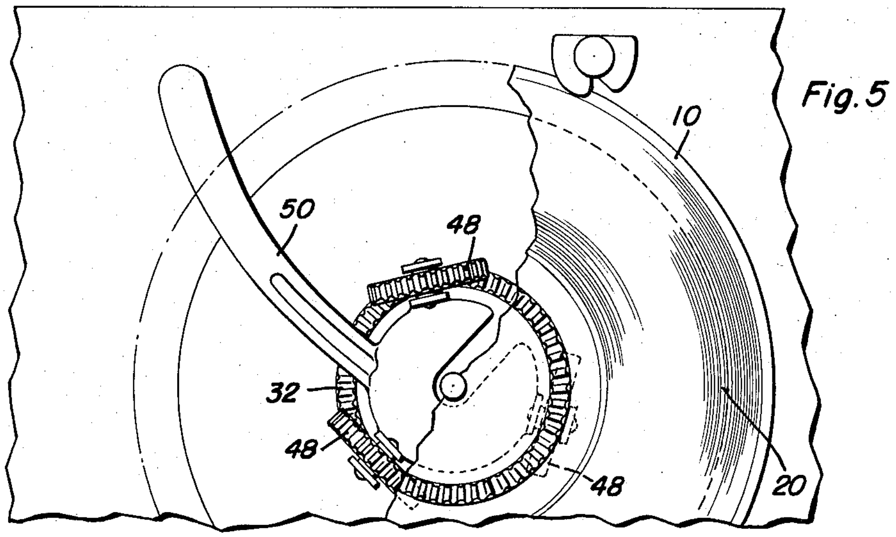
Figure 5 is a fragmentary top plan view, parts being broken away, of a portion of a record player showing a record supporting and driving means having an interlocking and non-slipping engagement with the driving ring portion of a record.

Thus, as shown in Figures 5–7 the records 10 are shown associated with such an apparatus which includes the turntable 20 having the interlocking surface 32 together with a record supporting and driving means of a construction disclosed and claimed in my prior Patent No. 2,729,455.

This last mentioned means includes a plurality of toothed supporting and driving rollers 48, each journaled upon a horizontal arm 50 mounted upon a vertically movable vertical shaft 52. The toothed surfaces of the rollers are engageable with and are similar and complementary to the interlocking surface 24 upon the bottom face of a record for supporting and rotating the same; and with surface 32 of the turntable, as in Figure 6, or with the interlocking top surface of a record whose interlocking bottom surface is engaged by the turntable surface 32, as in Figure 7. In either arrangement, a positive, non-slipping driving engagement is established between the turntable and the rollers 48; and between the latter and the record supported and rotated by the rollers. This positive, non-slipping driving engagement is augmented by the engagement of the pressure plate 38 of Figure 2 upon the record supported by the rollers 48, as shown in Figure 7.

Figure 6 illustrates the position of the mechanism when the first record to be played has ben released from the stack of records and is supported upon the rollers 48, while the latter are in contact with the driving surface 32 of the turntable. It is evident that there is a geared, positive, non-slipping interlocking driving engagement between the turntable and the intermediate rollers 48 and between the latter and the record disc supported thereon. This engagement is rendered more certain and safe by the engagement of the pressure plate and arm which have been omitted from Figure 6 in the interest of simplicity of illustration.

Figure 7 is similar to Figure 6, but illustrating the arrangement after a record has been played upon both sides and then lowered to the turntable. The rollers now rest upon the record which rests upon and is interlocked with the turntable and support a second record for driving the same.

It will thus be apparent that the interlocking surfaces of the records are essential in order to transmit without slippage or speed variation the drive from the turntable through the stack of records resting thereon and through the supporting rollers for rotating in the reverse direction the supporting record 10 during the playing of the undersurface of the same.

It will thus be seen that the positive interlocking surfaces of this record permit driving the record to be played at the desired speed of rotation, without slippage or variation, from the turntable either directly or indirectly as set forth in the various arrangements described hereinbefore.

From the foregoing, the construction and operation of the device will be readily understood and further explanation is beileved to be unnecessary.

However, since numerous modifications and changes will occur to those skilled in the art, it is not desired to limit the invention to the exact construction shown and described, and accordingly all suitable modifications and equivalents may be resorted to, falling within the scope of the appended claim.

Having described the invention, what is claimed as new is:

A phonograph record disk for use in automatically changing record players of the type wherein a record is lowered from a stack to a playing position upon a supporting and driving means above and operatively engaged with a turntable for playing the underside of a record disk thereon and then is lowered to engagement with a turntable or a sub-adjacent record engaged upon a turntable for playing the top side of the record disk and including means whereby pressure is applied upon the top of the record disk during the playing of said record disk in both positions, said records, supporting and driving means and the turntable having similar, complementary projections and valleys, comprising: a flat disk having on each side thereof a central portion with a spindle aperture therethrough and a sound track surrounding said central portion, an annulus rising from opposite sides of the disk upon each central portion and concentric with the spindle aperture therethrough, the top surface of each annulus having complementary alternate projections and valleys with gradual, continous, smoothly curving contours, the distance between the projections, the depths of the valleys and the gradualness of their contours being such that upon relative rotation of said disk with respect to said supporting and driving means, said turntable or said subadjacent record the similar projections of one may gently slide into the similar valleys of the other, thereby avoiding abrupt engagement and will be firmly retained in a positive, non-slipping and interlocking engagement by pressure applied to the top surface of the uppermost disk by said pressure applying means, both the tops of the projections and the bottoms of the valleys lying above the flat surface of the disk whereby an annulus of a record may engage with the complementary annulus of an adjacent record, to thereby support the records with their sound tracks in spaced relation.

References Cited in the file of this patent

UNITED STATES PATENTS

| | | |
|---|---|---|
| 1,288,610 | Jones | Dec. 24, 1918 |
| 1,675,852 | Geer | July 3, 1928 |
| 1,804,453 | Basseches | May 12, 1931 |
| 2,544,010 | Di Giannantonio | Mar. 6, 1951 |
| 2,559,786 | Mueller | July 10, 1951 |
| 2,600,573 | Rabkin | June 17, 1952 |

FOREIGN PATENTS

| | | |
|---|---|---|
| 63,231 | Denmark | Mar. 5, 1945 |
| 124,508 | Austria | Sept. 25, 1931 |